United States Patent
Kweon et al.

(10) Patent No.: US 7,306,016 B2
(45) Date of Patent: Dec. 11, 2007

(54) LIQUID CRYSTAL DISPENSING APPARATUS HAVING CONFIRMING FUNCTION FOR REMAINING AMOUNT OF LIQUID CRYSTAL AND METHOD FOR MEASURING THE SAME

(75) Inventors: Hyug-Jin Kweon, Kyoungsangbuk-Do (KR); Hae-Joon Son, Pusan (KR); Wan-Soo Kim, Gyeonggi-Do (KR)

(73) Assignee: LG.Philips LCD Co., Ltd., Seoul (KR)

( * ) Notice: Subject to any disclaimer, the term of this patent is extended or adjusted under 35 U.S.C. 154(b) by 0 days.

(21) Appl. No.: 10/895,934

(22) Filed: Jul. 22, 2004

(65) Prior Publication Data

US 2004/0256025 A1 Dec. 23, 2004

Related U.S. Application Data

(62) Division of application No. 10/329,603, filed on Dec. 27, 2002, now Pat. No. 6,782,928.

(30) Foreign Application Priority Data

| Mar. 15, 2002 | (KR) | 2002-0014201 |
| Mar. 21, 2002 | (KR) | 2002-0015436 |
| Mar. 21, 2002 | (KR) | 2002-0015449 |
| Mar. 22, 2002 | (KR) | 2002-0015739 |

(51) Int. Cl.
*B65B 1/30* (2006.01)

(52) U.S. Cl. .................. 141/192; 141/1; 141/31; 141/4

(58) Field of Classification Search .............. 141/192, 141/4, 31, 65, 7, 59, 63, 26, 67; 222/504, 222/394, 518, 420, 61, 56; 239/583, 584; 427/256

See application file for complete search history.

(56) References Cited

U.S. PATENT DOCUMENTS

| 3,978,580 A | 9/1976 | Leupp et al. |
| 4,094,058 A | 6/1978 | Yasutake et al. |

(Continued)

FOREIGN PATENT DOCUMENTS

EP 1 003 066 A1 A1 5/2000

(Continued)

*Primary Examiner*—Khoa D. Huynh
(74) *Attorney, Agent, or Firm*—McKenna, Long & Aldridge LLP

(57) ABSTRACT

A liquid crystal dispensing apparatus determines an amount of liquid crystal remaining within a liquid crystal container. The apparatus includes a liquid crystal dispensing unit for containing dispensable liquid crystal, capable of be dispensed directly onto a substrate and a main control unit for determining a total amount of liquid crystal dispensed onto the substrate based on a unitary amount of liquid crystal dispensed and the number of times the unitary amount was dispensed, and determining an amount of liquid crystal remaining by deducting the determined total amount dispensed from an initial amount of liquid crystal contained within the liquid crystal dispensing unit.

1 Claim, 9 Drawing Sheets

U.S. PATENT DOCUMENTS

| | | | |
|---|---|---|---|
| 4,653,864 A | 3/1987 | Baron et al. | |
| 4,661,368 A * | 4/1987 | Rohde et al. | 427/8 |
| 4,691,995 A | 9/1987 | Yamazaki et al. | |
| 4,775,225 A | 10/1988 | Tsuboyama et al. | |
| 5,054,691 A * | 10/1991 | Huang et al. | 239/585.3 |
| 5,074,443 A * | 12/1991 | Fujii et al. | 222/639 |
| 5,247,377 A | 9/1993 | Omeis et al. | |
| 5,263,888 A | 11/1993 | Ishihara et al. | |
| 5,277,333 A * | 1/1994 | Shimano | 222/14 |
| 5,294,022 A * | 3/1994 | Earle | 222/56 |
| 5,379,139 A | 1/1995 | Sato et al. | |
| 5,406,989 A | 4/1995 | Abe | |
| 5,499,128 A | 3/1996 | Hasegawa et al. | |
| 5,507,323 A | 4/1996 | Abe | |
| 5,511,591 A | 4/1996 | Abe | |
| 5,539,545 A | 7/1996 | Shimizu et al. | |
| 5,548,429 A | 8/1996 | Tsujita | |
| 5,628,349 A * | 5/1997 | Diggins et al. | 141/3 |
| 5,642,214 A | 6/1997 | Ishii et al. | |
| 5,680,189 A | 10/1997 | Shimizu et al. | |
| 5,680,960 A * | 10/1997 | Keyes et al. | 222/64 |
| 5,742,370 A | 4/1998 | Kim et al. | |
| 5,757,451 A | 5/1998 | Miyazaki et al. | |
| 5,808,559 A * | 9/1998 | Buckler | 340/870.09 |
| 5,816,445 A * | 10/1998 | Gardos et al. | 222/504 |
| 5,852,484 A | 12/1998 | Inoue et al. | |
| 5,854,664 A | 12/1998 | Inoue et al. | |
| 5,861,932 A | 1/1999 | Inata et al. | |
| 5,875,922 A | 3/1999 | Chastine et al. | |
| 5,952,676 A | 9/1999 | Sato et al. | |
| 5,956,112 A | 9/1999 | Fujimori et al. | |
| 6,001,203 A | 12/1999 | Yamada et al. | |
| 6,010,740 A * | 1/2000 | Rutledge et al. | 427/8 |
| 6,011,609 A | 1/2000 | Kato et al. | |
| 6,016,178 A | 1/2000 | Kataoka et al. | |
| 6,016,181 A | 1/2000 | Shimada | |
| 6,055,035 A | 4/2000 | von Gutfeld et al. | |
| 6,163,357 A | 12/2000 | Nakamura | |
| 6,219,126 B1 | 4/2001 | von Gutfeld | |
| 6,226,067 B1 | 5/2001 | Nishiguchi et al. | |
| 6,236,445 B1 | 5/2001 | Foschaar et al. | |
| 6,257,445 B1 * | 7/2001 | Means et al. | 222/1 |
| 6,267,297 B1 * | 7/2001 | Contadini et al. | 239/1 |
| 6,296,811 B1 * | 10/2001 | Sasaki | 422/100 |
| 6,304,306 B1 | 10/2001 | Shiomi et al. | |
| 6,304,311 B1 | 10/2001 | Egami et al. | |
| 6,318,599 B2 * | 11/2001 | Estelle et al. | 222/146.5 |
| 6,337,730 B1 | 1/2002 | Ozaki et al. | |
| 6,354,471 B2 * | 3/2002 | Fujii | 222/380 |
| 6,414,733 B1 | 7/2002 | Ishikawa et al. | |
| 6,814,810 B2 * | 11/2004 | Prentice et al. | 118/677 |
| 2001/0021000 A1 | 9/2001 | Egami | |
| 2004/0001177 A1 * | 1/2004 | Byun et al. | 349/187 |
| 2005/0122463 A1 * | 6/2005 | Byun et al. | 349/187 |

FOREIGN PATENT DOCUMENTS

| | | |
|---|---|---|
| JP | 51-065656 | 6/1976 |
| JP | 57-038414 A1 | 3/1982 |
| JP | 57-088428 A1 | 6/1982 |
| JP | 58-027126 A1 | 2/1983 |
| JP | 59-057221 | 4/1984 |
| JP | 59-195222 | 11/1984 |
| JP | 60-111221 | 6/1985 |
| JP | 60-164723 A1 | 8/1985 |
| JP | 60-217343 A1 | 10/1985 |
| JP | 61-007822 A1 | 1/1986 |
| JP | 61-055625 A1 | 3/1986 |
| JP | 62-054225 | 3/1987 |
| JP | 62-054228 | 3/1987 |
| JP | 62-054229 | 3/1987 |
| JP | 62-089025 A1 | 4/1987 |
| JP | 62-090622 A1 | 4/1987 |
| JP | 62-205319 A1 | 9/1987 |
| JP | 63-109413 A1 | 5/1988 |
| JP | 63-110425 A1 | 5/1988 |
| JP | 63-128315 A1 | 5/1988 |
| JP | 63-311233 A1 | 12/1988 |
| JP | 03-009549 | 1/1991 |
| JP | 05-036425 | 2/1993 |
| JP | 05-036426 | 2/1993 |
| JP | 05-107533 | 4/1993 |
| JP | 05-127179 A1 | 5/1993 |
| JP | 05-154923 | 6/1993 |
| JP | 05-265011 A1 | 10/1993 |
| JP | 05-281557 A1 | 10/1993 |
| JP | 05-281562 A1 | 10/1993 |
| JP | 06-018829 | 1/1994 |
| JP | 06-064229 | 1/1994 |
| JP | 06-051256 A1 | 2/1994 |
| JP | 06-148657 A1 | 5/1994 |
| JP | 06-160871 | 6/1994 |
| JP | 06-194637 | 7/1994 |
| JP | 06-235925 | 8/1994 |
| JP | 06-265915 A1 | 9/1994 |
| JP | 06-313870 | 11/1994 |
| JP | 07-084268 | 3/1995 |
| JP | 07-128674 A1 | 5/1995 |
| JP | 07-181507 A1 | 7/1995 |
| JP | 07-275770 | 10/1995 |
| JP | 07-275771 | 10/1995 |
| JP | 08-076133 | 3/1996 |
| JP | 08-095066 A1 | 4/1996 |
| JP | 08-101395 | 4/1996 |
| JP | 08-106101 A1 | 4/1996 |
| JP | 08-110504 | 4/1996 |
| JP | 08-136937 | 5/1996 |
| JP | 08-171094 A1 | 7/1996 |
| JP | 08-173874 | 7/1996 |
| JP | 08-190099 A1 | 7/1996 |
| JP | 08-240807 A1 | 9/1996 |
| JP | 09-001026 | 1/1997 |
| JP | 09-005762 A1 | 1/1997 |
| JP | 09-026578 A1 | 1/1997 |
| JP | 09-061829 | 3/1997 |
| JP | 09-073075 A1 | 3/1997 |
| JP | 09-073096 A1 | 3/1997 |
| JP | 09-094500 | 4/1997 |
| JP | 09-127528 A1 | 5/1997 |
| JP | 09-230357 A1 | 9/1997 |
| JP | 09-281511 A1 | 10/1997 |
| JP | 09-311340 A1 | 12/1997 |
| JP | 10-123537 | 5/1998 |
| JP | 10-123538 | 5/1998 |
| JP | 10-142616 A1 | 5/1998 |
| JP | 10-174924 | 6/1998 |
| JP | 10-177178 | 6/1998 |
| JP | 10-221700 A1 | 8/1998 |
| JP | 10-282512 A1 | 10/1998 |
| JP | 10-333157 | 12/1998 |
| JP | 10-333159 | 12/1998 |
| JP | 11-014953 A1 | 1/1999 |
| JP | 11-038424 A1 | 2/1999 |
| JP | 11-064611 A1 | 3/1999 |
| JP | 11-109388 A1 | 4/1999 |
| JP | 11-133438 | 5/1999 |
| JP | 11-142864 | 5/1999 |
| JP | 11-174477 A1 | 7/1999 |
| JP | 11-212045 A1 | 8/1999 |
| JP | 11-248930 | 9/1999 |
| JP | 11-262712 | 9/1999 |
| JP | 11-264991 | 9/1999 |
| JP | 11-326922 | 11/1999 |
| JP | 11-344714 A1 | 12/1999 |

| | | | | | | |
|---|---|---|---|---|---|---|
| JP | 2000-002879 | 1/2000 | | JP | 2001-330840 A1 | 11/2001 |
| JP | 2000-029035 | 1/2000 | | JP | 2001-356353 | 12/2001 |
| JP | 2000-056311 | 2/2000 | | JP | 2001-356354 A1 | 12/2001 |
| JP | 2000-066165 | 3/2000 | | JP | 2002-014360 A1 | 1/2002 |
| JP | 2000-066218 | 3/2000 | | JP | 2002-023176 A1 | 1/2002 |
| JP | 2000-093866 | 4/2000 | | JP | 2002-049045 A1 | 2/2002 |
| JP | 2000-137235 | 5/2000 | | JP | 2002-079160 | 3/2002 |
| JP | 2000-147528 | 5/2000 | | JP | 2002-080321 | 3/2002 |
| JP | 2000-193988 | 7/2000 | | JP | 2002-082340 A1 | 3/2002 |
| JP | 2000-241824 | 9/2000 | | JP | 2002-090759 A1 | 3/2002 |
| JP | 2000-284295 | 10/2000 | | JP | 2002-090760 A1 | 3/2002 |
| JP | 2000-292799 | 10/2000 | | JP | 2002-107740 A1 | 4/2002 |
| JP | 2000-310759 | 11/2000 | | JP | 2002-122870 | 4/2002 |
| JP | 2000-310784 | 11/2000 | | JP | 2002-122872 A1 | 4/2002 |
| JP | 2000-338501 | 12/2000 | | JP | 2002-122873 A1 | 4/2002 |
| JP | 2001-005401 | 1/2001 | | JP | 2002-131762 | 5/2002 |
| JP | 2001-005405 | 1/2001 | | JP | 2002-139734 | 5/2002 |
| JP | 2001-013506 | 1/2001 | | JP | 2002-156518 | 5/2002 |
| JP | 2001-033793 A1 | 2/2001 | | JP | 2002-169166 | 6/2002 |
| JP | 2001-042341 | 2/2001 | | JP | 2002-169167 | 6/2002 |
| JP | 2001-051284 | 2/2001 | | JP | 2002-182222 | 6/2002 |
| JP | 2001-066615 | 3/2001 | | JP | 2002-202512 A1 | 7/2002 |
| JP | 2001-091727 | 4/2001 | | JP | 2002-202514 | 7/2002 |
| JP | 2001-117105 | 4/2001 | | JP | 2002-214626 A1 | 7/2002 |
| JP | 2001-117109 | 4/2001 | | JP | 2002-229042 | 8/2002 |
| JP | 2001-133745 | 5/2001 | | JP | 2002-236276 | 8/2002 |
| JP | 2001-133794 | 5/2001 | | JP | 2002-258299 | 8/2002 |
| JP | 2001-133799 | 5/2001 | | JP | 2002-236292 | 9/2002 |
| JP | 2001-142074 | 5/2001 | | JP | 2002-277865 | 9/2002 |
| JP | 2001-147437 | 5/2001 | | JP | 2002-277866 | 9/2002 |
| JP | 2001-154211 | 6/2001 | | JP | 2002-277881 | 9/2002 |
| JP | 2001-166272 | 6/2001 | | JP | 2002-287156 | 10/2002 |
| JP | 2001-166310 | 6/2001 | | JP | 2002-296605 | 10/2002 |
| JP | 2001-183683 | 7/2001 | | JP | 2002-311438 | 10/2002 |
| JP | 2001-209052 | 8/2001 | | JP | 2002-311440 | 10/2002 |
| JP | 2001-209056 | 8/2001 | | JP | 2002-311442 | 10/2002 |
| JP | 2001-209057 | 8/2001 | | JP | 2002-323687 | 11/2002 |
| JP | 2001-209058 | 8/2001 | | JP | 2002-323694 | 11/2002 |
| JP | 2001-209060 | 8/2001 | | JP | 2002-333628 | 11/2002 |
| JP | 2001-222017 | 8/2001 | | JP | 2002-333635 | 11/2002 |
| JP | 2001-235758 | 8/2001 | | JP | 2002-333843 | 11/2002 |
| JP | 2001-215459 | 9/2001 | | JP | 2002-341329 | 11/2002 |
| JP | 2001-255542 | 9/2001 | | JP | 2002-341355 | 11/2002 |
| JP | 2001-264782 | 9/2001 | | JP | 2002-341356 | 11/2002 |
| JP | 2001-201750 | 10/2001 | | JP | 2002-341357 | 11/2002 |
| JP | 2001-272640 | 10/2001 | | JP | 2002-341358 | 11/2002 |
| JP | 2001-281675 | 10/2001 | | JP | 2002-341359 | 11/2002 |
| JP | 2001-281678 | 10/2001 | | JP | 2002-341362 | 11/2002 |
| JP | 2001-282126 | 10/2001 | | KR | 2000-035302 A1 | 6/2000 |
| JP | 2001-305563 | 10/2001 | | | | |
| JP | 2001-330837 | 11/2001 | | | | |

\* cited by examiner

LIQUID CRYSTAL DISPENSING APPARATUS HAVING CONFIRMING FUNCTION FOR REMAINING AMOUNT OF LIQUID CRYSTAL AND METHOD FOR MEASURING THE SAME

This application is a divisional application of U.S. patent application Ser. No.: 10/329,603, filed Dec. 27, 2002, now U.S. Pat. No. 6,782,928; which claims priority to Korean Patent Application No. 2002-0014201, filed on Mar. 15, 2002, Korean Patent Application No. 2002-0015436, filed on Mar. 21, 2002, Korean Patent Application No. 2002-0015449, filed Mar. 21, 2002, and Korean Patent Application No. 2002-0015739, filed Mar. 22, 2002

This application incorporates by reference two co-pending applications, Ser. No. 10/184,096, filed on Jun. 28, 2002, entitled "SYSTEM AND METHOD FOR MANUFACTURING LIQUID CRYSTAL DISPLAY DEVICES" Ser. No. 10/184,088, filed on Jun. 28, 2002, entitled "SYSTEM FOR FABRICATING LIQUID CRYSTAL DISPLAY AND METHOD OF FABRICATING LIQUID CRYSTAL DISPLAY USING THE SAME", as if fully set forth herein.

BACKGROUND OF THE INVENTION

1. Field of the Invention

The present invention relates to a liquid crystal dispensing apparatus, and more particularly, to a liquid crystal dispensing apparatus capable of determining an amount of liquid crystal material to be dispensed onto a substrate and also capable of determining an amount of liquid crystal material remaining within a liquid crystal container.

2. Discussion of the Background Art

As portable electric devices such as mobile phones, personal digital assistants (PDA), notebook computers, etc., continue to be developed, small, light, and power-efficient flat panel display devices such as liquid crystal displays (LCD), plasma display panels (PDP), field emission displays (FED), vacuum fluorescent displays (VFD), etc., have become the subject of intense research. Due to their ability to be mass-produced, ease in driving, and superior image qualities, LCDs are of particular interest.

LCDs display information on a screen using refractive anisotropic properties of liquid crystal material. Referring to FIG. 1, an LCD 1 typically includes a lower substrate (i.e., a driving device array substrate) 5 connected to an upper substrate (i.e., a color filter substrate) 3 via sealant 9. A layer of liquid crystal material 7 separates the lower and upper substrates 5 and 3. A plurality of pixels (not shown) are formed on the lower substrate 5 and driving devices such as thin film transistors (TFTs) are formed on each of the pixels. A color filter layer is formed on the upper substrate 3 allowing the LCD to express color. Further, pixel electrodes and a common electrode are also formed on the lower and upper substrates 5 and 3, respectively. An alignment layer is formed on both the lower and upper substrates 5 and 3 to uniformly align molecules within the layer of liquid crystal material 7. The molecules within the layer of liquid crystal material may be selectively oriented by the driving devices. Accordingly, as the orientation of the molecules within the liquid crystal material is manipulated, the amount of light transmitted through portions of the LCD may be selectively controlled to convey information.

Fabrication processes for LCD devices may be roughly divided into a driving device array fabrication process, where driving devices are formed on the lower substrate 5, a color filter fabrication process, where the color filter is formed on the upper substrate 3, and a cell fabrication process. These fabrication processes will now be described with reference to FIG. 2.

Referring to FIG. 2, in the driving device array substrate fabrication process (S101), a plurality pixel areas are formed at crossings of a plurality of gate lines and data lines formed on the lower substrate 5 and thin film transistors arranged in each pixel area are connected to gate lines and corresponding ones of data lines. Also, pixel electrodes are connected to each of the thin film transistors to drive the layer of liquid crystal material. Accordingly, the layer of liquid crystal material may be driven in accordance with a signal applied to the thin film transistor.

In the color filter fabrication process (S104), red (R), green (G), and blue (B) color filter layers for producing color and a common electrode are formed on the upper substrate 3.

The alignment layer is formed on both the lower and upper substrates 5 and 3, respectively. After being formed on the substrates, the alignment layer is rubbed to induce molecules within the layer of liquid crystal material to inherit a predetermined pretilt angle and alignment direction between the lower and upper substrates 5 and 3 (S102 and S105). Subsequently, spacers are dispensed over the lower substrate 5 to maintain a uniform cell gap between the upper and lower substrates (S103). The sealant is applied to an outer portion of the upper substrate 3 (S106) and the lower substrate 5 is pressed and attached to the upper substrate 3 (S107).

The lower and upper substrates 5 and 3 are formed from glass substrates having an area larger in size than any individual panel areas. Accordingly, a plurality of corresponding panel areas where driving devices and color filter layers are may be arranged within the attached glass substrates. Thus, in fabricating individual liquid crystal display panels, the attached glass substrates are cut into individual panels (S108). Subsequently, liquid crystal material is injected through a liquid crystal injection opening into the cell gap formed between the two substrates of each individual liquid crystal display panel (S109). After the liquid crystal material is injected, the liquid crystal injection opening is sealed (S109) and each individual liquid crystal display panel is inspected (S110).

To inject the liquid crystal material through the liquid crystal injection opening, a pressure difference between the exterior and the interior of the liquid crystal display panel is induced. FIG. 3 illustrates a device used to inject liquid crystal material into cell gaps of liquid crystal display panels.

Referring to FIG. 3, liquid crystal material 14 is provided in a container 12 arranged within a vacuum chamber 10 that is connected to a vacuum pump (not shown) capable of creating and maintaining a vacuum within the vacuum chamber. A liquid crystal display panel moving device (not shown) is installed within the vacuum chamber 10 and moves separated liquid crystal display panels down from an upper portion of the container 12 toward the surface of the liquid crystal material 14. In what is known as a liquid crystal injection method, the liquid crystal injection opening 16 of each liquid crystal display panel is arranged to contact the liquid crystal material. Subsequently, nitrogen gas (N2) is pumped into the vacuum chamber to increase the pressure therein from the initial vacuum pressure. As the pressure within the vacuum chamber 10 increases, the liquid crystal material 14 contacting the liquid crystal injection opening 16 is extruded (i.e., injected) into the cell gap of the liquid crystal display panel due to the pressure difference between the interior of the liquid crystal display panel and the interior of the vacuum chamber containing the pumped nitrogen gas. After the cell gap is completely filled with liquid crystal material 14, the injection opening 16 is sealed using a sealant.

Injecting liquid crystal material according to the process described above is disadvantageous, however, at least for the following reasons.

First, the amount of time required to completely inject liquid crystal material 14 into the liquid crystal display panel 1 can be excessively long. For example, the cell gap between the driving device array and the color filter substrates is very narrow (e.g., on the order of a few micrometers) and, therefore, only a very small amount of liquid crystal material can be injected into the liquid crystal display panel at any time. Accordingly, injecting liquid crystal material into a typical 15-inch liquid crystal display panel using the injection process described above may take up to about eight hours. Thus, the time required to fabricate LCDs is unduly increased with the use of the liquid crystal injection process.

Second, the amount of liquid crystal material required by the liquid crystal injection method described above is exceedingly large. While only a small amount of liquid crystal is removed from the container 12, a large amount of liquid crystal may become exposed to the atmosphere or to the nitrogen gas. Accordingly, a large amount of liquid crystal material reacts with, and can be contaminated by, nitrogen or other gases within the atmosphere. As a result, the cost of fabricating LCDs increases because liquid crystal material not injected into the liquid crystal display panel must be discarded after the injection process.

SUMMARY OF THE INVENTION

Accordingly, the present invention is directed to a liquid crystal dispensing apparatus having a confirming function for determining an amount of amount of liquid crystal material remaining within a liquid crystal apparatus and a method of detecting the same that substantially obviates one or more of the problems due to limitations and disadvantages of the related art.

An advantage of the present invention provides an apparatus for dispensing liquid crystal material directly onto a glass substrate having an area greater than an area of at least one individual LCD panel.

Additional features and advantages of the invention will be set forth in the description which follows, and in part will be apparent from the description, or may be learned by practice of the invention. These and other advantages of the invention will be realized and attained by the structure particularly pointed out in the written description and claims hereof as well as the appended drawings.

To achieve these and other advantages and in accordance with the purpose of the present invention, as embodied and broadly described herein, there may be provided a liquid crystal dispensing apparatus capable of dispensing liquid crystal material onto a substrate within at least one individual LCD panel area that may, for example, include a needle sheet having a discharging hole through which the liquid crystal may be dispensed onto the substrate, a needle moveable between a down position, where the needle blocks the discharging hole, and an up position, where the needle is separated from the discharging hole, a spring member to bias the needle toward the down position, and a solenoid coil to provide a magnetic force to bias the needle toward the up position, an electric power supply for providing electric power to the solenoid coil, enabling the solenoid coil to bias the needle toward the up position, a gas supply for providing pressurized gas to force liquid crystal material through the discharging hole when the needle is biased in the up position, and a main control unit for determining an amount of liquid crystal material to be dispensed onto the substrate and for determining an amount of liquid crystal material remaining within the liquid crystal dispensing apparatus.

In one aspect of the present invention, the main control unit may determine the amount of liquid crystal material remaining within the liquid crystal dispensing apparatus by deducting a determined total amount of liquid crystal material dispensed from a predetermined amount of liquid crystal contained in the liquid crystal dispensing apparatus.

In another aspect of the present invention, the main control unit may include a unitary amount dispensed determining unit for determining a unitary amount of liquid crystal material that is to be dispensed onto the substrate, a dispensing counter unit for determining the number of times unitary amounts of liquid crystal material have been dispensed by determining the number of times power from the electric power supply is applied to the solenoid coil, a total amount dispensed determining unit for determining a total amount of liquid crystal material that is dispensed onto the substrate based on the unitary amount of liquid crystal material to be dispensed and the number of times unitary amounts of liquid crystal material have been dispensed, and an amount remaining determining unit for determining an amount of liquid crystal material remaining within the liquid crystal dispensing apparatus by deducting the total amount of liquid crystal material that is dispensed onto the substrate from an initial amount of liquid crystal material contained in the liquid crystal dispensing apparatus.

In yet another aspect of the present invention, a method for determining an amount of liquid crystal material remaining within a liquid crystal dispensing apparatus may include the steps of determining a total amount of liquid crystal material dispensed onto a substrate, based on a unitary amount of liquid crystal material to be dispensed and the number of times liquid crystal material is dispensed, and determining an amount of liquid crystal material remaining within the liquid crystal apparatus by deducting the total amount of liquid crystal material dispensed onto the substrate from a predetermined amount of liquid crystal material contained within the liquid crystal dispensing apparatus.

In still another aspect of the present invention, if it is determined that an amount of liquid crystal material remaining within the liquid crystal dispensing apparatus is less than a predetermined minimum threshold amount, a signal may be generated representing an instruction to fill the liquid crystal dispensing apparatus with liquid crystal material. Alternatively, if it is determined that an amount of liquid crystal material remaining is greater than the predetermined minimum threshold amount and the liquid crystal material has been dispensed onto a predetermined number of substrates, a signal may be transmitted representing an instruction to dispense the liquid crystal material remaining within the liquid crystal dispensing apparatus onto an additional substrate.

To achieve these and other advantages and in accordance with the purpose of the present invention, as embodied and broadly described herein, there may also be provided a liquid crystal dispensing apparatus including a transparent liquid crystal container for containing liquid crystal material that is to be dispensed onto a substrate, wherein the liquid crystal container is supplied with pressurized gas, a nozzle arranged at a lower portion of the liquid crystal container, through which liquid crystal material is dispensed, and a valve structure for allowing liquid crystal material within the liquid crystal container to enter the nozzle via pressure from the supplied gas.

In one aspect of the present invention, the valve structure may include a needle sheet having a discharging hole through which liquid crystal material may be discharged from the liquid crystal container to the nozzle, a needle member arranged within the liquid crystal container and capable of moving toward and away from the needle sheet, wherein liquid crystal material may be prevented from entering the discharging hole when the needle member contacts the needle sheet, and a solenoid provided for moving the needle member away from the needle sheet, thereby allowing liquid crystal material to enter into the discharging hole.

In another aspect of the present invention, the nozzle may include a discharging opening through which liquid crystal material may be dispensed, and a supporting portion for fixing the discharging opening. In another aspect of the present invention, the liquid crystal container may be made of a material such as quartz.

To achieve these and other advantages and in accordance with the purpose of the present invention, as embodied and broadly described herein, there may also be provided a liquid crystal dispensing apparatus including a liquid crystal container filled with liquid crystal material to be dispensed on a substrate, wherein the liquid crystal container is supplied with pressurized gas, a transparent tube arranged adjacent the liquid crystal container and filled with the liquid crystal material contained by the liquid crystal container, a nozzle arranged at a lower portion of the liquid crystal container, through which liquid crystal material may be dispensed, and a valve structure for providing liquid crystal material from the liquid crystal container to the nozzle via pressure from the supplied gas.

In one aspect of the present invention, the liquid crystal container may be formed of an opaque material such as stainless steel and the tube may be provided as a transparent pipe made of a material such as quartz coated with and fluorine resin, wherein liquid crystal material within the liquid crystal container is also contained within the tube, and wherein the tube measures an amount of liquid crystal material remaining in the liquid crystal container.

In another aspect of the present invention, there may also be provided a liquid crystal dispensing apparatus including, for example, a liquid crystal dispensing unit in which liquid crystal is contained for directly dispensing liquid crystal material onto a substrate, and a weight measuring unit arranged within the liquid crystal dispensing unit for measuring a weight of the liquid crystal material remaining within the liquid crystal dispensing unit.

In one aspect of the present invention, the liquid crystal dispensing unit may include a liquid crystal container filled with liquid crystal to be dispensed onto a substrate, wherein the liquid crystal container is supplied with gas, an upper cap for fixing to the liquid crystal container, a nozzle arranged at a lower portion of the liquid crystal container through which liquid crystal material may be dispensed onto a substrate, and a valve structure for providing liquid crystal material from the liquid crystal container to the nozzle via pressure from the supplied gas.

In another aspect of the present invention, the weight measuring unit may be provided as a scale and arranged between a lower surface of the upper cap an upper surface of a fixing member such that a weight of the liquid crystal dispensing unit is applied to the scale and an amount of liquid crystal material remaining within the liquid crystal dispensing unit may be determined. The weight of the remaining amount of liquid crystal material may be converted into a volume and displayed through a display unit.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE ILLUSTRATED EMBODIMENTS

Reference will now be made in detail to embodiments of the present invention, examples of which are illustrated in the accompanying drawings.

In order to solve the problems of the aforementioned liquid crystal material injection methods, liquid crystal dispensing methods have been proposed. The liquid crystal dispensing method forms a liquid crystal layer by dispensing liquid crystal material directly onto a substrate and uniformly distributing the dispensed liquid crystal material over the entire surface of the substrate by pressing the substrate. The aforementioned liquid crystal dispensing method enables the liquid crystal material to be arranged on the substrate within a short period of time so that the process of forming a liquid crystal layer in large LCD panels may be performed quickly. Since a predetermined amount of liquid crystal material is dispensed on the substrate, consumption of liquid crystal material is minimized and costs of manufacturing LCDs may be reduced.

Figure 4:
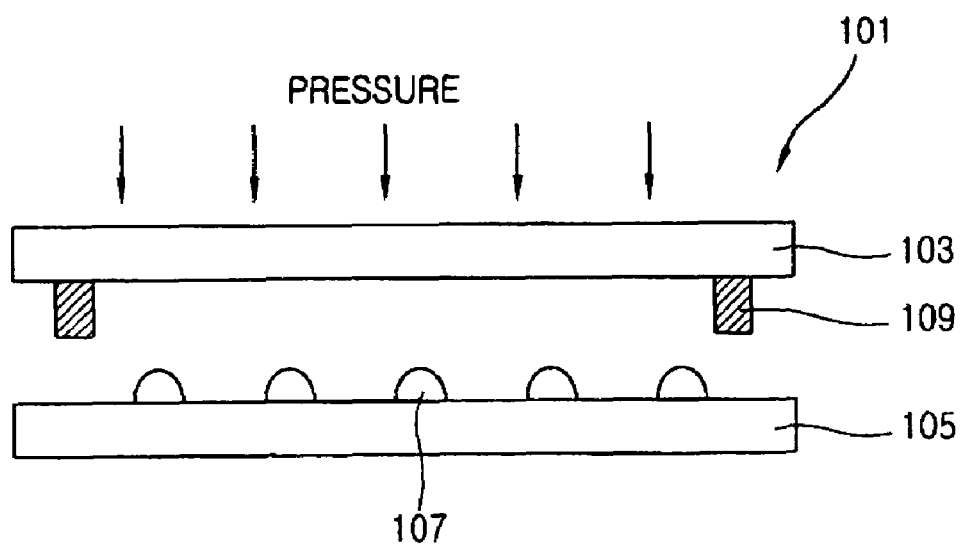
FIG. 4 illustrates the fabrication of an LCD using a liquid crystal dispensing method according to one aspect of the present invention.

FIG. 4 illustrates the fabrication of an LCD using a liquid crystal dispensing method according to one aspect of the present invention.

Referring to FIG. 4, the liquid crystal material may be dispensed prior to bonding a lower substrate 105, on which driving devices may be formed, and an upper substrate 103, on which a color filter may be formed, together. Accordingly, liquid crystal material 107 may be dispensed on the lower substrate 105, for example, in the form of a droplet. Alternatively, the liquid crystal material 107 may be dispensed on the upper substrate 103. Regardless of which substrate supports the liquid crystal material 107, during the bonding process, the substrate supporting liquid crystal material 107 should be arranged such that it is located under the other substrate, wherein the liquid crystal material 107 is arranged between the two substrates.

Sealant 109 may be dispensed along edges on the upper substrate 103 to bond the upper substrate 103 to the lower substrate 105 when they are pressed together. As the upper and lower substrates 103 and 105, respectively, are pressed, the liquid crystal material 107 becomes spread so that a liquid crystal layer having a uniform thickness may be formed between the upper and lower substrate 103 and 105. Subsequently, the bonded substrates may be separated into individual LCD panels. Accordingly, the liquid crystal dispensing method may dispense liquid crystal material 107 onto the lower substrate 105 prior to final assembly of the liquid crystal display panel 101.

Figure 5:
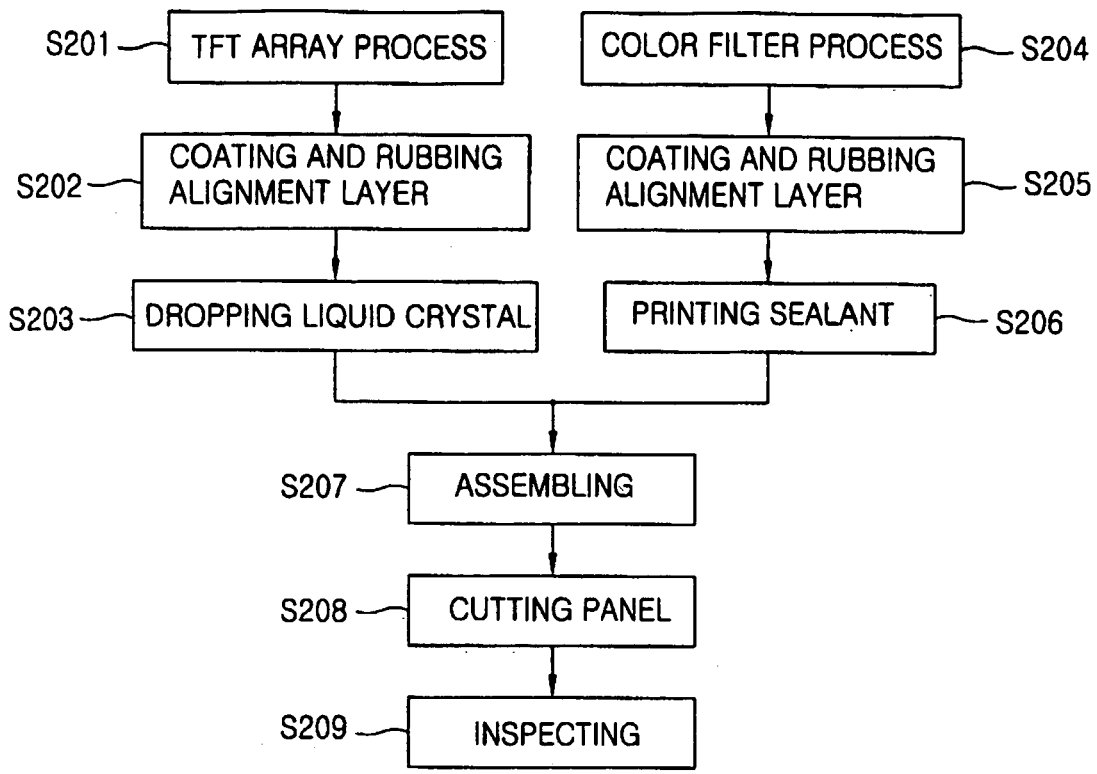
FIG. 5 illustrates a flow chart of a method for fabricating an LCD device using a liquid crystal dispensing method.

FIG. 5 illustrates a flow chart of a method for fabricating LCD device using a liquid crystal dispensing method.

Figure 1:
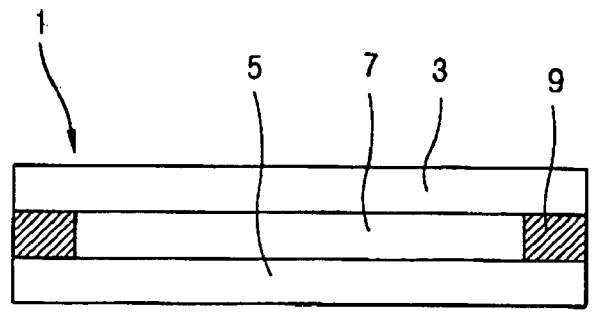
FIG. 1 illustrates a cross-sectional view of a related art liquid crystal display (LCD) device.
Figure 2:
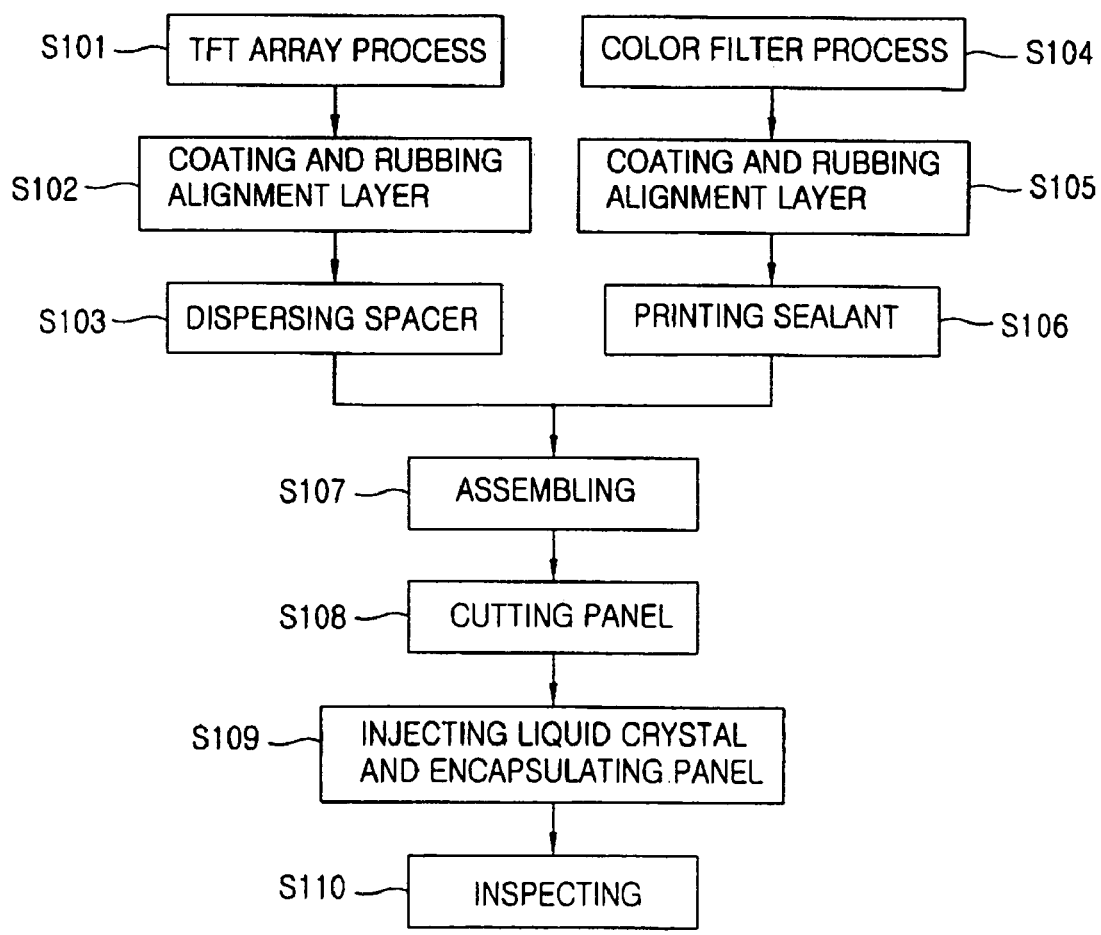
FIG. 2 illustrates a flow chart of a related art LCD fabrication method.
Figure 3:
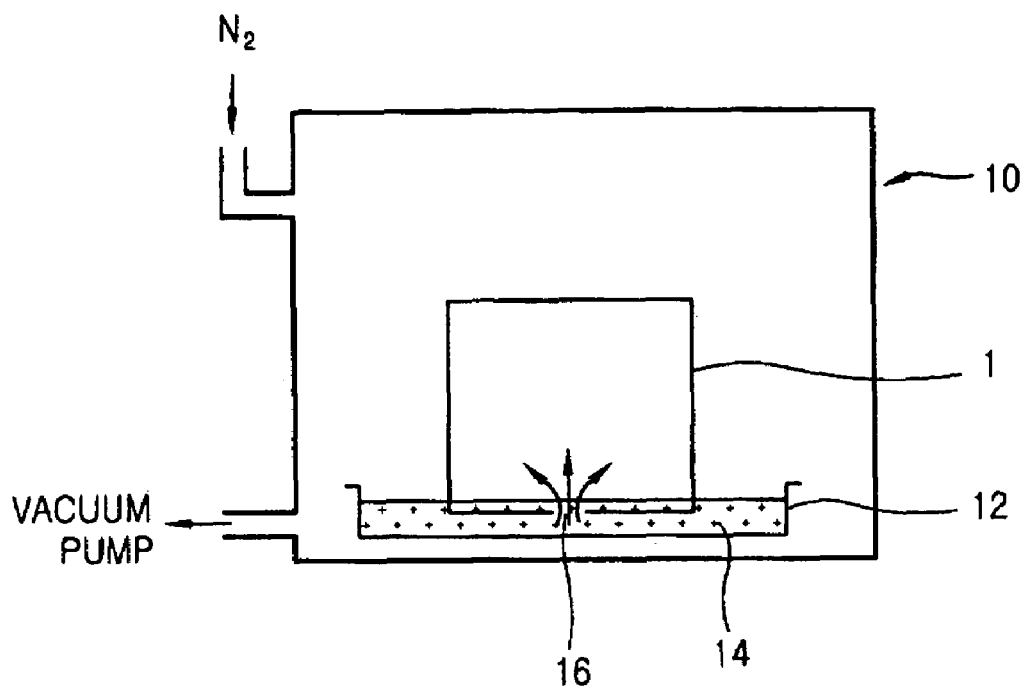
FIG. 3 illustrates injection of liquid crystal material in a related art LCD device.

Referring to FIG. 5, driving devices (e.g., TFTs) and a color filter layer are formed on the lower and upper substrates, respectively, in respective TFT array fabrication and color filter fabrication processes (S201 and S204), similar to the driving device array substrate fabrication and color filter fabrication processes shown in FIG. 2. The lower and upper substrates may be provided as glass substrates including a plurality of individual panel areas. By incorporating the liquid crystal dispensing method in the fabrication of LCDs, glass substrates having an area up to 1000×1200 mm$^2$ or more (an area much larger than glass substrates fabricated using liquid crystal injection methods) may be efficiently processed into individual panels.

An alignment layer may be formed on the lower and upper substrates. Subsequently, the alignment layers may be rubbed (S202 and S205) and liquid crystal material may be dispensed onto liquid crystal display panel areas within the lower substrate (S203). Also, sealant may be applied to outer portions of corresponding liquid crystal display panel areas within the upper substrate (S206).

Next, the upper and lower substrates may be disposed opposite each other and pressed and attached together via the sealant. When the two substrates are pressed, the dispensed liquid crystal material spreads uniformly over the entire surface of the panels (S207). By the aforementioned liquid crystal dispensing method, a plurality of liquid crystal display panels may be simultaneously formed within the attached upper and lower glass substrates. Next, the attached glass substrates may be cut (S208) to separate the plurality of individual LCD panels. The individual LCD panels may then be inspected (S209).

Manufacturing LCDs according to the aforementioned liquid crystal dispensing method is advantageous over the liquid crystal injection method illustrated, for example, in FIG. 2 in that layers of liquid crystal material may be rapidly formed between the upper and lower substrates. The liquid crystal injection method shown in FIG. 2 requires the injection opening to be sealed by the sealing material after injection is complete. However, in fabricating LCDs via the liquid crystal dispensing method, no injection openings exist that need to be sealed. In fabricating LCDs via the liquid crystal injection method, panels contact liquid crystal material within the container during injection. As a result, outer surfaces of the LCD panels become contaminated and a cleaning process is required. However, in fabricating LCDs via the liquid crystal dispensing method, liquid crystal material may be dispensed directly onto the substrate. As a result, outer surfaces of substrates are not contaminated with liquid crystal material and extra cleaning processes are not required. Accordingly, methods of fabricating LCDs that incorporate liquid crystal dispensing methods are less complex, more efficient, and have a greater yield than methods of fabricating LCDs that incorporate liquid crystal injection methods.

In fabricating LCDs via the liquid crystal dispensing method, the layer of liquid crystal material must be formed to a predetermined thickness, directly proportional to the size of the cell gap in the LCD panel. Accordingly, positions of the liquid crystal droplets and the amount of liquid crystal material they contain must be precisely controlled. Therefore, an apparatus for dispensing liquid crystal material in precisely arranged droplets each containing a precise amount of liquid crystal material is provided in accordance with the principles of the present invention.

Figure 6:
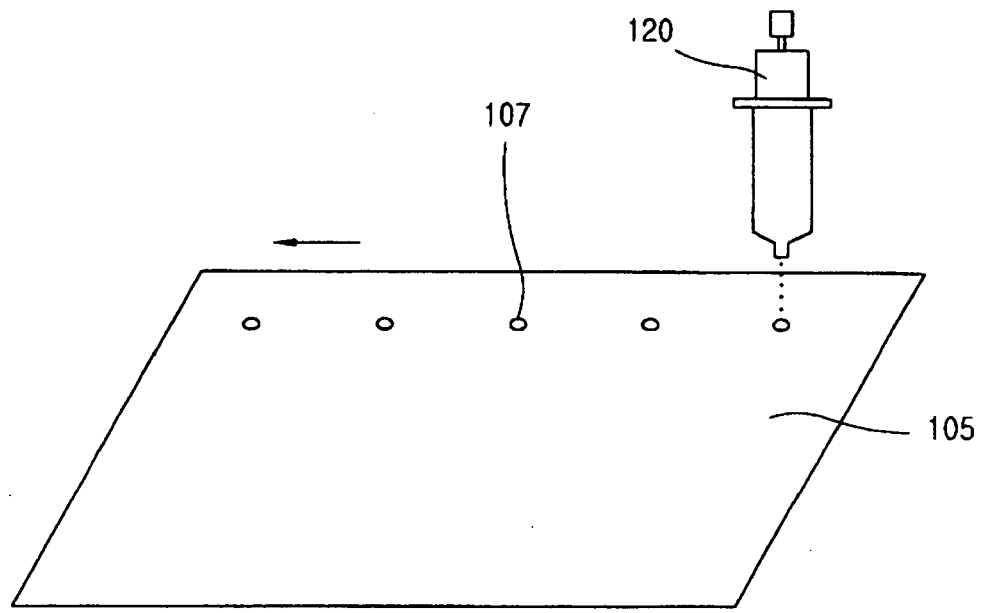
FIG. 6 illustrates the fabrication of an LCD using a liquid crystal dispensing method according to another aspect of the present invention.

FIG. 6 illustrates the fabrication of an LCD using a liquid crystal dispensing method according to one aspect of the present invention.

Referring to FIG. 6, liquid crystal material 107 may be dispensed onto the lower substrate 105 (including a plurality of panel areas) using a liquid crystal dispensing apparatus 120. In accordance with the principles of the present invention, the liquid crystal dispensing apparatus 120 may be arranged over the substrate 105 and, although not shown in FIG. 6, contains liquid crystal material to be dispensed.

Generally, the liquid crystal material 107 is dispensed onto the substrate in the form of a droplet. In a first aspect of the present invention, the substrate 105 may move in x- and y-directions at a predetermined speed while the liquid crystal dispensing apparatus 120 remains in a fixed position and dispenses liquid crystal material at predetermined times. As a result, droplets of liquid crystal material may be arranged on the substrate 105 and spaced apart from each other along x- and y-directions at predetermined intervals. In second aspect of the present invention, the substrate 105 may remain in a fixed position while the liquid crystal dispensing apparatus 120, moving in x- and y-directions, dispenses liquid crystal material onto the substrate. Similar to the effect of the preceding aspect, droplets of liquid crystal material may be arranged on the substrate 105 and spaced apart from each other along x- and y-directions at predetermined intervals. By the second aspect, liquid crystal material may, however, by dispensed non-uniformly onto the substrate 105 due to the movement of the liquid crystal dispensing apparatus 120. Accordingly, the locations of, and amount of liquid crystal material contained in, droplets arranged on the substrate 105 may deviate from the predetermined locations and amounts. Therefore, dispensing liquid crystal material according to the first aspect is generally preferred over the second aspect.

Figure 7A:
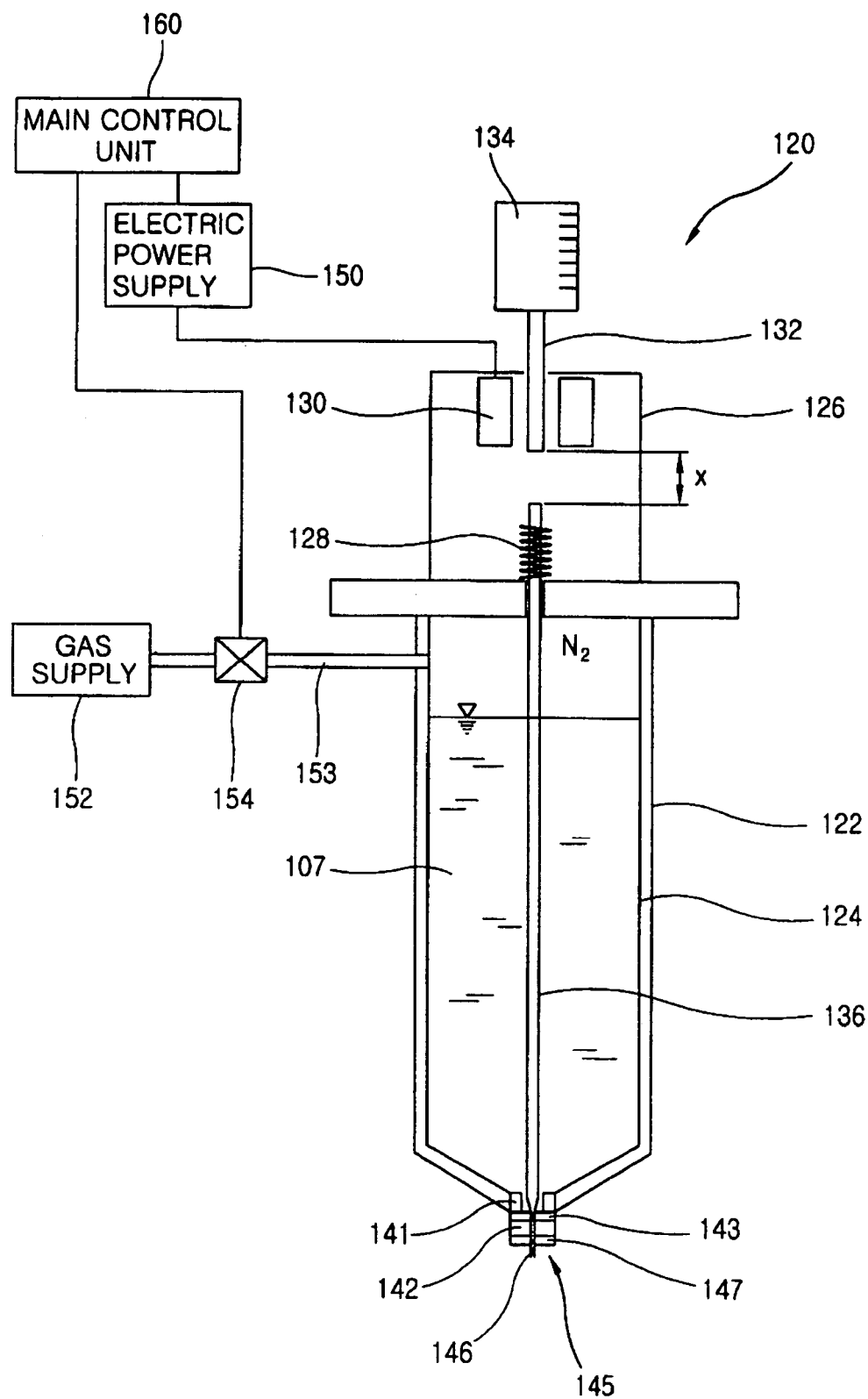
FIGS. 7A and 7B illustrate a liquid crystal dispensing apparatus according to one aspect of the present invention.
Figure 7B:
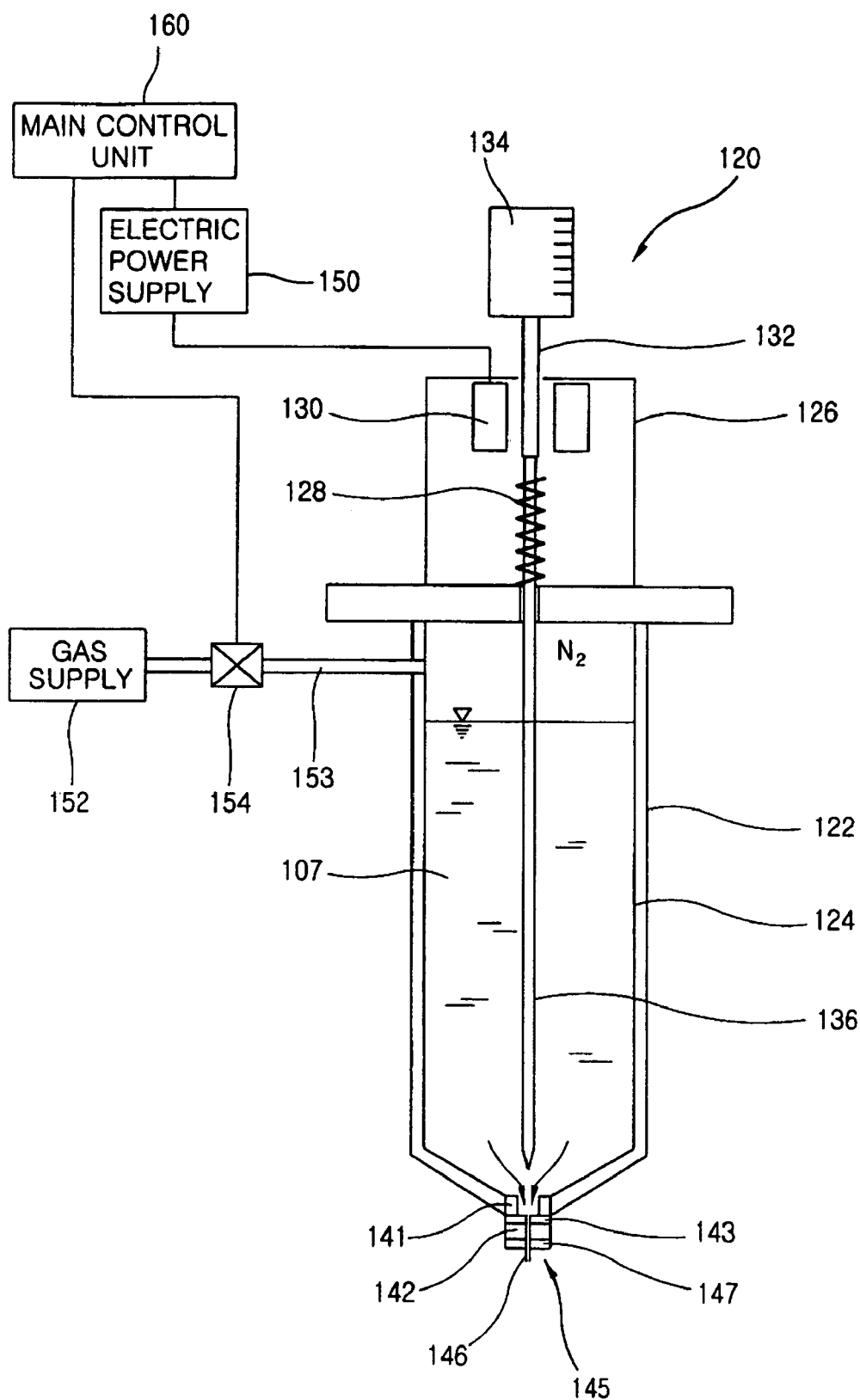

FIGS. 7A and 7B illustrate a liquid crystal dispensing apparatus according to one aspect of the present invention. FIG. 7A illustrates the liquid crystal dispensing apparatus when liquid crystal material is not dispensed. FIG. 7B illustrates the liquid crystal dispensing apparatus when liquid crystal material is dispensed.

Referring to FIGS. 7A and 7B, the liquid crystal dispensing apparatus may, for example, include a cylindrically shaped liquid crystal container 124. In one aspect of the present invention, the liquid crystal container 124 may be made of a material a having a high moldability, high plasticity, and substantially non-reactive with liquid crystal material (e.g., polyethylene, etc.). Materials such as polyethylene, however, have a low strength and may therefore become easily deformed by applied stresses. When the liquid crystal container 124 is deformed, liquid crystal material cannot be dispensed precisely onto the substrate. Accordingly, the container 124 may be inserted within case 122. In one aspect of the present invention, case 122 may be formed of a material having a high strength (e.g., stainless steel, etc.). A gas supply tube 153 connected to an exterior gas supply unit 152 may be arranged at an upper portion of the liquid crystal container 124. Inert gas such as nitrogen ($N_2$) may be provided by the exterior gas supply unit, transported through the gas supply tube, and arranged within portions of the liquid crystal container 124 not occupied by liquid crystal material 107. Accordingly, the gas may press on the liquid crystal material 107 and induce the liquid crystal material to be dispensed.

In one aspect of the present invention, the liquid crystal container 124 may be formed out of a material that does not deform (e.g., a metal such as stainless steel, etc.). Accordingly, when the liquid crystal container 124 is formed out of a metal such as stainless steel, the case 122 may not be required and the fabrication cost of the liquid crystal dispensing unit 120 may be reduced. According to the present aspect, the interior of the liquid crystal container 124 may be coated with a fluorine resin thereby preventing liquid crystal material 107 contained within the liquid crystal container 124 from chemically reacting with the metal.

In one aspect of the present invention, and although not shown, a protrusion may extend from a lower portion of the liquid crystal container 124 and an opening may be formed within the case 122 to receive the protrusion. Accordingly, the protrusion of the liquid crystal container 124 may be inserted into the opening of the case 122 and coupled to a first coupling portion 141. A first nut (i.e., female threaded portion) may be arranged on the protrusion while a first bolt (i.e., male threaded portion) may be formed on a first side of the first coupling portion 141. Accordingly, the protrusion and the first coupling portion 141 may be coupled together via the first nut and the first bolt.

In one aspect of the present invention, a second nut may be formed on a second side of the first coupling portion 141 and a second bolt may be formed on a first side of a second coupling portion 142. Accordingly, first and second coupling portions 141 and 142 may be coupled to each other via the second nut and the second bolt. A needle sheet 143 may be inserted into the second nut of the first coupling portion 141. Accordingly, the needle sheet 143 may be arranged between the first and second coupling portions 141 and 142 when the second bolt of the second coupling portion 142 is inserted into and coupled with the second nut of the first coupling portion 141. Liquid crystal material 107 may exit the liquid crystal dispensing apparatus 120 via a discharging hole (not shown) formed within the needle sheet 143.

In one aspect of the present invention, a nozzle 145 may be arranged on the second coupling portion 142 and coupled to the first coupling portion 141 via the second nut and second bolt. The nozzle 145 may include a supporting portion 147 coupled to the second nut and a discharging opening 146, through which liquid crystal material 107 within the liquid crystal container 124 may be dispensed onto the substrate. In one aspect of the present invention, the discharging opening 146 may protrude from the supporting portion 147. In one aspect of the present invention, the supporting portion 147 may include the second bolt. The discharging opening 146 formed within the nozzle 145 may be have a small diameter to allow precise control in dispensing liquid crystal material.

In one aspect of the present invention, a discharging tube may be formed in the supporting portion 147 and extend into the discharging hole of the needle sheet 143. The discharging tube may be connected to the discharging opening 146.

A needle 136 may be inserted into the liquid crystal container 124 such that a first end of the needle 136 contacts the needle sheet 143. In one aspect of the present invention, the first end of the needle 136 may be provided with a conical shape having dimensions substantially conformal to the dimensions of the discharging hole. When the needle 136 contacts the needle sheet 143, the needle may block the discharging hole.

According to the principles of the present invention, a second end of the needle 136 may be arranged near an upper case 126 of the liquid crystal dispensing apparatus 120 where a spring 128 and magnetic bar 132 are provided. The magnetic bar 132 may be formed of a ferromagnetic or soft magnetic material. A gap controlling unit 134 may be connected to the needle 136 above the magnetic bar 132. A solenoid coil 130 having, for example, a cylindrical shape may be arranged to surround at least a portion of the magnetic bar 132. Although not shown, the solenoid coil 130 may be connected to, and receive electric power from, an electric power supply unit 150. Upon receipt of the electric power, the solenoid coil 130 may exert a magnetic force on the magnetic bar 132.

In one aspect of the present invention, the needle 136 and the magnetic bar 132 may be spaced apart from each other by a predetermined distance, x. When the electric power is applied to the solenoid coil 130, a magnetic force is exerted on the magnetic bar 132 to induce the needle 136 to contact the magnetic bar 132. When the electric power is not applied to the solenoid coil 130, the elastic force of the spring 128 pushes the needle 136 to its original position. By the movement of the needle 136 toward and away from the needle sheet 143, the discharging hole formed in the needle sheet 143 may be opened or closed. As the first end of the needle 136 and the needle sheet 143 may contact each other repeatedly, depending on the presence of electric power applied to the solenoid coil 130, the first end of the needle 136 and the needle sheet 143 may become damaged. Accordingly, the first end of the needle 136 and the needle sheet 143 may be formed of a material that substantially resists deformation (e.g., a hard metal). Also, the needle 136 should be formed of a magnetic material such that it may be magnetically attracted by the magnetic bar 132.

Referring to FIG. 7B, when electric power is applied to the solenoid coil 130, the needle 136 is away from the needle sheet and the discharging hole is opened. Accordingly, nitrogen gas supplied to the liquid crystal container 124 presses on the liquid crystal material 107 and causes it to be dispensed via the nozzle 145. The amount of liquid crystal material 107 dispensed depends upon the time during which the discharging hole is open and the pressure of the nitrogen gas within the liquid crystal container. The time during which the discharging hole is opened depends upon the distance, x, between the needle 136 and the magnetic bar 132, the magnetic force exerted on the magnetic bar 132 by the solenoid coil, and the intrinsic elastic force of the spring 128. The magnetic force exerted on the magnetic bar 132 is proportional to the winding number of the solenoid coil 130 or the magnitude of the electric power applied to the solenoid 130. The distance, x, between the needle 136 and the magnetic bar 132 may be controlled by the gap controlling unit 134.

According to the principles of the present invention, a flow control valve 154 may be arranged at the gas supply tube 153 supplying gas from the gas supply 152 to the liquid crystal container 124. The flow control valve 154 regulates the flow of gas into the liquid, crystal container 124 according to a control signal applied from a main control unit 160. Accordingly, a predetermined pressure may be maintained within the liquid crystal container using, for example, the main control unit 160 and the flow control valve 154. In addition to controlling the flow control valve 154, the main control unit 160 also controls the amount of electric power the electric power supply 150 supplies to the solenoid 130. In one aspect of the present invention, the main control unit 160 may direct the electric power supply 150 to supply a predetermined electric power to the solenoid coil 130 by outputting a control signal to the electric power supply 150. In another aspect of the present invention, the main control unit 160 may calculate an amount of liquid crystal material 107 remaining in the liquid crystal container 124 based on a unitary amount of liquid crystal material that is to be dispensed and the number of times the liquid crystal material is dispensed.

As will be discussed in greater detail below, determination of an amount of liquid crystal material remaining within the liquid crystal apparatus may be made to prevent LCDs from being fabricated with uneven layers of liquid crystal material. Further, determining amounts of liquid crystal material remaining within the liquid crystal dispensing apparatus may increase the efficiency with which liquid crystal material is used.

Generally, the liquid crystal container 124 contains an initial, predetermined amount of liquid crystal material 107. After liquid crystal material has been dispensed onto a predetermined number of substrates, new liquid crystal material must be added to the liquid crystal container 124. During dispensing, unitary amounts of liquid crystal material dispensed do not always contain the same amounts of liquid crystal material. The amounts of liquid crystal material within each unitary dispensing may vary due to factors contributed by the environment outside the liquid crystal dispensing apparatus. While unitary amounts of liquid crystal material may vary slightly, these slight deviations, however, significantly affect the amount of liquid crystal material consumed as a predetermined number of substrates receive the liquid crystal material. When, for example, each unitary amount of liquid crystal dispensed is slightly greater than a predetermined unitary amount, an insufficient amount of liquid crystal material remaining within the liquid crystal dispensing apparatus may be available to be dispensed onto a last one of a series of consecutively processed substrates. In the event that an insufficient amount of liquid crystal material is dispensed onto a substrate, normally black mode and normally white mode LCDs cannot effectively convey images containing black and white, respectively.

In the event that, after dispensing liquid crystal material onto a predetermined number of substrates, an excessive amount of the liquid crystal material contained within the liquid crystal container 124 remaining within the liquid crystal container 124 is exposed to the air when new liquid crystal added to the liquid crystal container 124. When new liquid crystal material is added, the liquid crystal material remaining within the liquid crystal apparatus may react with components in the air (e.g., moisture) and become contaminated. Accordingly, the contaminated liquid crystal material must be discarded. If the amount of liquid crystal material remaining within the liquid crystal container 124 was sufficient to be dispensed onto an additional substrate, the cost of fabricating LCDs increases due to unnecessary discarding of liquid crystal material. According to the principles of the present invention, when an amount of liquid crystal material remaining in the liquid crystal container is greater than an amount of liquid crystal material sufficient to be dispensed onto a substrate, the liquid crystal material remaining within the liquid crystal container may be dispensed onto the substrate. Accordingly, the amount of undispensed liquid crystal material that is discarded may be reduced, thereby minimizing the cost of fabricating an LCD.

According to the principles of the present invention, the amount of liquid crystal material contained within the liquid crystal container 124 may be determined to prevent expensive liquid crystal from being unnecessarily discarded.

Figure 8:
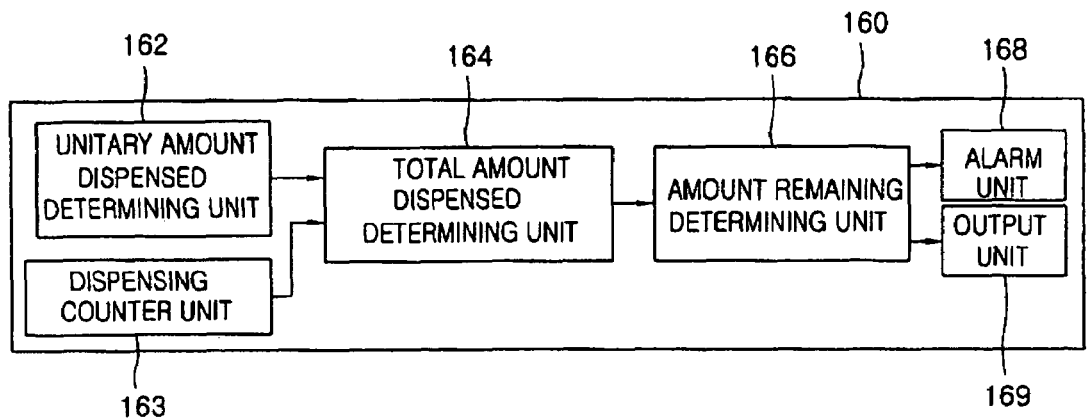
FIG. 8 illustrates a functional block diagram of a main control unit shown in FIGS. 7A and 7B.

FIG. 8 illustrates a functional block diagram of a main control unit shown in FIGS. 7A and 7B.

Referring to FIG. 8, the main control unit 160 may, for example, include a unitary amount dispensed determining unit 162 for determining a unitary amount of liquid crystal material that is to be dispensed onto a substrate, a dispensing counter unit 163 for determining the number of times unitary amounts liquid crystal material is dispensed by determining the number of times the needle 136 moves toward and away from the needle sheet 143, a total amount dispensed determining unit 164 for determining a total amount of liquid crystal material that is dispensed onto a substrate based on the unitary amount of liquid crystal to be dispensed, as determined by the unitary amount dispensed determining unit 162, and the number of times unitary amounts of liquid crystal material have been dispensed, as determined by the dispensing counter unit 163, an amount remaining determining unit 166 for determining an amount of liquid crystal material remaining within the liquid crystal container 124 by deducting the total amount of liquid crystal material dispensed, as determined by the total amount dispensed determining unit 164, from an initial amount of liquid crystal material contained within the liquid crystal container 124, an output unit 168 for outputting various types of information such as a total amount of liquid crystal material dispensed and an amount of liquid crystal material remaining within the liquid crystal container 124, and a warning unit 169 for generating a signal representing an instruction to fill the liquid crystal container 124 with liquid crystal material if it is determined that an amount of liquid crystal material remaining within the liquid crystal container is less than a predetermined minimum threshold amount (e.g., an amount of liquid crystal material required to be dispensed on a predetermined number of substrates) and for generating a signal when representing an instruction to dispense liquid crystal material remaining within the liquid crystal dispensing apparatus onto a substrate if it determined that an amount of liquid crystal remaining within the liquid crystal container 124 is greater than the predetermined minimum threshold amount after liquid crystal material has been dispensed on the predetermined number of substrates and is the amount of liquid crystal material remaining within the liquid crystal container 124 is greater than an amount of liquid crystal material to be dispensed onto a predetermined substrate. In one aspect of the present invention, the dispensing counter unit 163 may determine the number of times unitary amounts of liquid crystal material have been dispensed by determining the number of times power from the electric power supply 150 is applied to the solenoid coil 130.

In one aspect of the present invention, the unitary amount of liquid crystal material to be dispensed onto a substrate may be predetermined and set manually. Depending on the unitary amount of liquid crystal material to be dispensed, the main control unit 160 may control the flow control valve 154 to supply a corresponding predetermined amount of gas to the liquid crystal container 124. Simultaneously, the main control unit 160 may also control the electric power supply 150 to supply a corresponding predetermined amount of power to the solenoid coil 130. In one aspect of the present invention, the predetermined distance, x, between the needle 136 and the magnetic bar 132 may be set manually.

The dispensing counter unit 163 may determine the number of times unitary amounts of liquid crystal material have been dispensed by determining the number of times power has been applied to the solenoid coil 130 from the electric power supply 150. The total amount dispensed determining unit 164 may determine a total amount of liquid crystal material dispensed based on the number of times unitary amounts of liquid crystal material have been dispensed and the unitary amount of liquid crystal material to be dispensed. The amount remaining determining unit 166 may deduct the total amount of liquid crystal material dispensed from the initial amount of liquid crystal material contained within the liquid crystal container 124 determine the amount of liquid crystal material remaining within the liquid crystal container 124.

In one aspect of the present invention, the output unit 168 may output various types of information such as an amount of liquid crystal remaining within the liquid crystal container 124. The output unit 168 may, for example, include a display device such as a cathode ray tube (CRT) or a liquid crystal display (LCD) device and an output device such as a printer.

Figure 9:
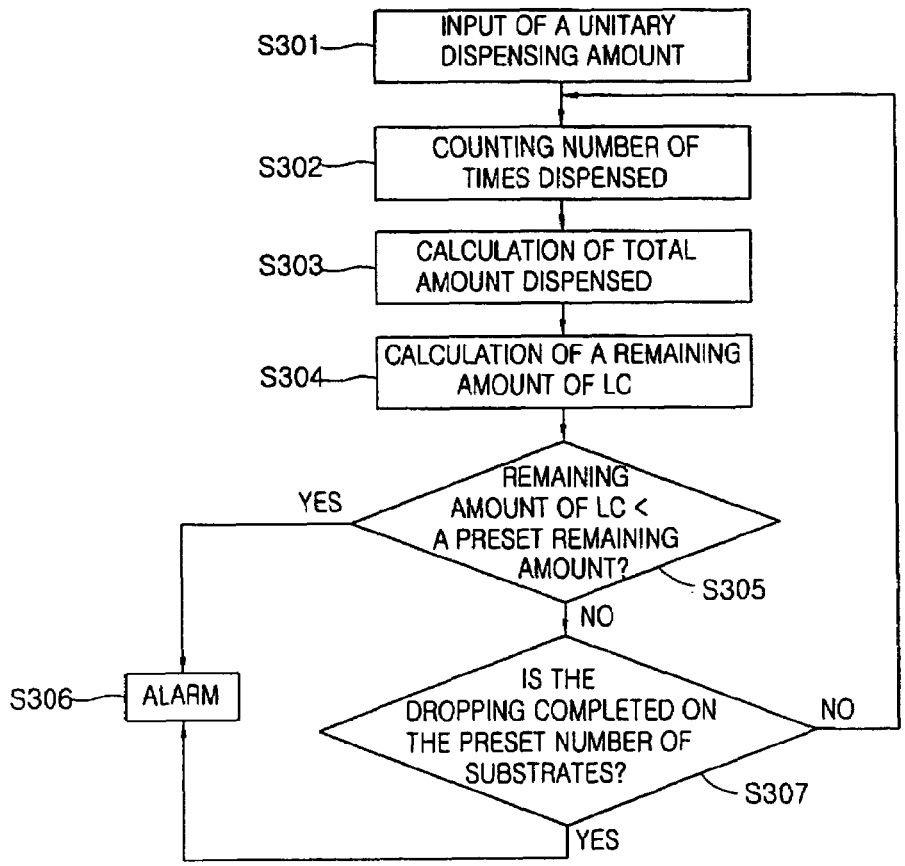
FIG. 9 illustrates a flow chart of a process for measuring an amount of liquid crystal material remaining within a liquid crystal container according one aspect of the present invention.

FIG. 9 illustrates a flow chart of a process for measuring an amount of liquid crystal material remaining within a liquid crystal container 124 according one aspect of the present invention.

Referring to FIG. 9, a unitary amount of liquid crystal to be dispensed and individual dispensing positions may be inputted and set via the main control unit 160. Subsequently, the liquid crystal dispensing apparatus 120 may initiate a liquid crystal material dispensing sequence according to the inputted information (S301). The main control unit 160 then determines the number of times power from the electric power supply 150 is applied to the solenoid coil 130 to thereby determine the number of times unitary amounts of liquid crystal material are dispensed (S302). Next, the total amount of liquid crystal material dispensed is determined based on the determinations made in the previous two process steps (S303).

Subsequently, the total amount of liquid crystal material dispensed is deducted from an initial amount of liquid crystal material contained within the liquid crystal container 124 such that an amount of liquid crystal material 107 remaining within the liquid crystal container 124 is determined (S304). In the event that the determined amount of liquid crystal material remaining within the liquid crystal container 124 is less than a predetermined minimum threshold amount, a signal may be generated representing an instruction to fill the liquid crystal container 124 with liquid crystal material 107 (S305, S306). Further, in the event that the amount of liquid crystal remaining within the liquid crystal container 124 is greater than the predetermined minimum threshold amount after liquid crystal material 107 has been dispensed on a predetermined number of substrates, a signal may be generated representing an instruction to dispense liquid crystal material onto an additional substrate (S307).

According to the principles of the present invention, a total amount of liquid crystal material dispensed may be determined by the main control unit. Subsequently, an amount of liquid crystal material remaining within the liquid crystal container 124 may be determined via calculation. Accordingly, minute amounts of liquid crystal material may be measured in view of external conditions such that substantially no difference exists between the amount of liquid crystal actually remaining within the liquid crystal container 124 and the determined amount of liquid crystal material remaining within the liquid crystal container 124. However, the main control unit 160 includes a relatively complex and expensive control system that increases the cost of fabricating LCDs.

Accordingly the principles of the present invention provide a means with which to determine an amount of liquid crystal material remaining within the liquid crystal container 124 that do not necessarily include use of the main control unit 160.

In one aspect of the present invention, an amount of liquid crystal material remaining within the liquid crystal container 124 may be determined visually. Accordingly, the liquid crystal container 124 may be formed from a substantially transparent material, allowing a visual determination to be as to the amount of liquid crystal material 107 remaining at any time within the liquid crystal container 124.

While any transparent material may be used in forming the liquid crystal container 124, consideration should be given to the transparent material's ability to withstand deformation. When the liquid crystal container 124 becomes deformed during dispensing, the placement of liquid crystal droplets on the substrate, and the amount of liquid crystal material they contain may deviate from their optimal positions/amounts. Accordingly, the transparent material of which the liquid crystal container 124 is formed should be able to substantially resist deformation. In one aspect of the present invention, a transparent material, resistive to deformation, and resistant to external forces, such as quartz, may be used to form the liquid crystal container 124. In one aspect of the present, a scale by which a remaining amount of liquid crystal may be determined may be arranged on the liquid crystal container 124 formed of transparent material.

Figure 10:
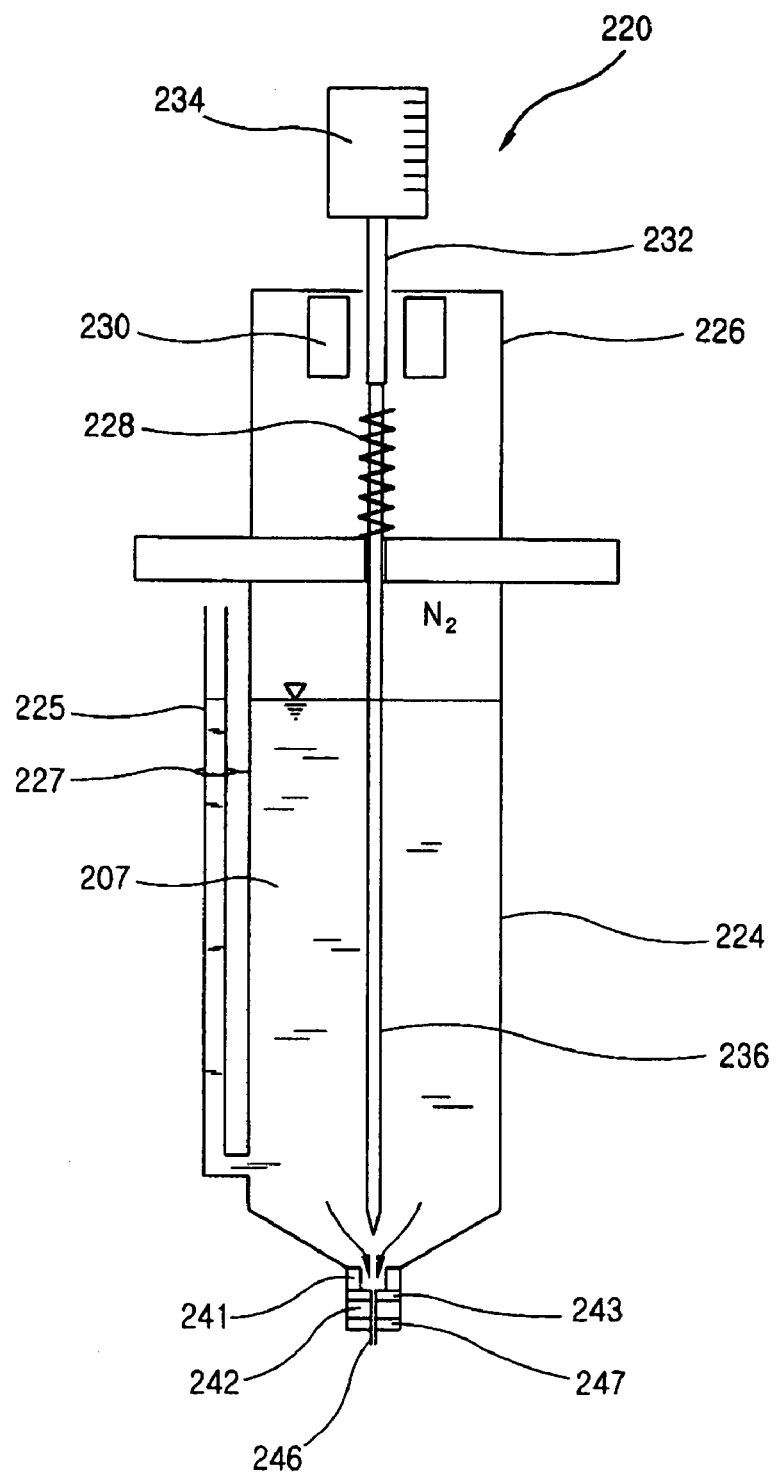
FIG. 10 illustrates a liquid crystal dispensing apparatus according to another aspect of the present invention.

FIG. 10 illustrates a liquid crystal dispensing apparatus according to another aspect of the present invention.

Referring to FIG. 10, an amount of liquid crystal material remaining within the liquid crystal container 224 may be determined using a transparent tube 225 fixed to a lateral surface of an opaque liquid crystal container 224. The tube 225 may be connected to a lateral bottom portion of the liquid crystal container 224 and may be formed to substantially the same height as the liquid crystal container 224. In one aspect of the present invention, the tube 225 may be arranged at any portion of the liquid crystal container 224. In another aspect of the present invention, the tube 225 may be arranged at a lower portion of the liquid crystal container 207 so as to enable the determination of all the liquid crystal material 207 contained within the liquid crystal container 224. Accordingly, liquid crystal material 207 within the liquid crystal container 224 may also be contained within the tube 225. In one aspect of the present invention, an amount of liquid crystal material 207 remaining within the liquid crystal container 224 may be determined by measuring a height of the liquid crystal material 207 contained in the tube 225. In the event that an amount of liquid crystal material remaining within the liquid crystal container 224 is less or greater than the predetermined minimum threshold amount (e.g., an amount of liquid crystal material determined by deducting a total amount of liquid crystal dispensed from an initial amount of liquid crystal material contained within the container), the number of substrates liquid crystal material may be dispensed onto may be adjusted. Accordingly, the liquid crystal material may be dispensed efficiently.

In one aspect of the present invention, the tube 225 may be provided as a transparent tube formed out of a transparent material, resistive to deformation, and resistant to external forces, such as quartz having a large intensity such as quartz or as a flexible tube formed out of a fluorine resin such as teflon. Further, the tube 225 may be formed out of any other suitable material that is transparent and substantially unreactive with liquid crystal material 207. In one aspect of the present invention, a fixing member 227 having a ring shape capable of receiving the tube 225 may be arranged at an upper portion of the liquid crystal container 224.

Figure 11:
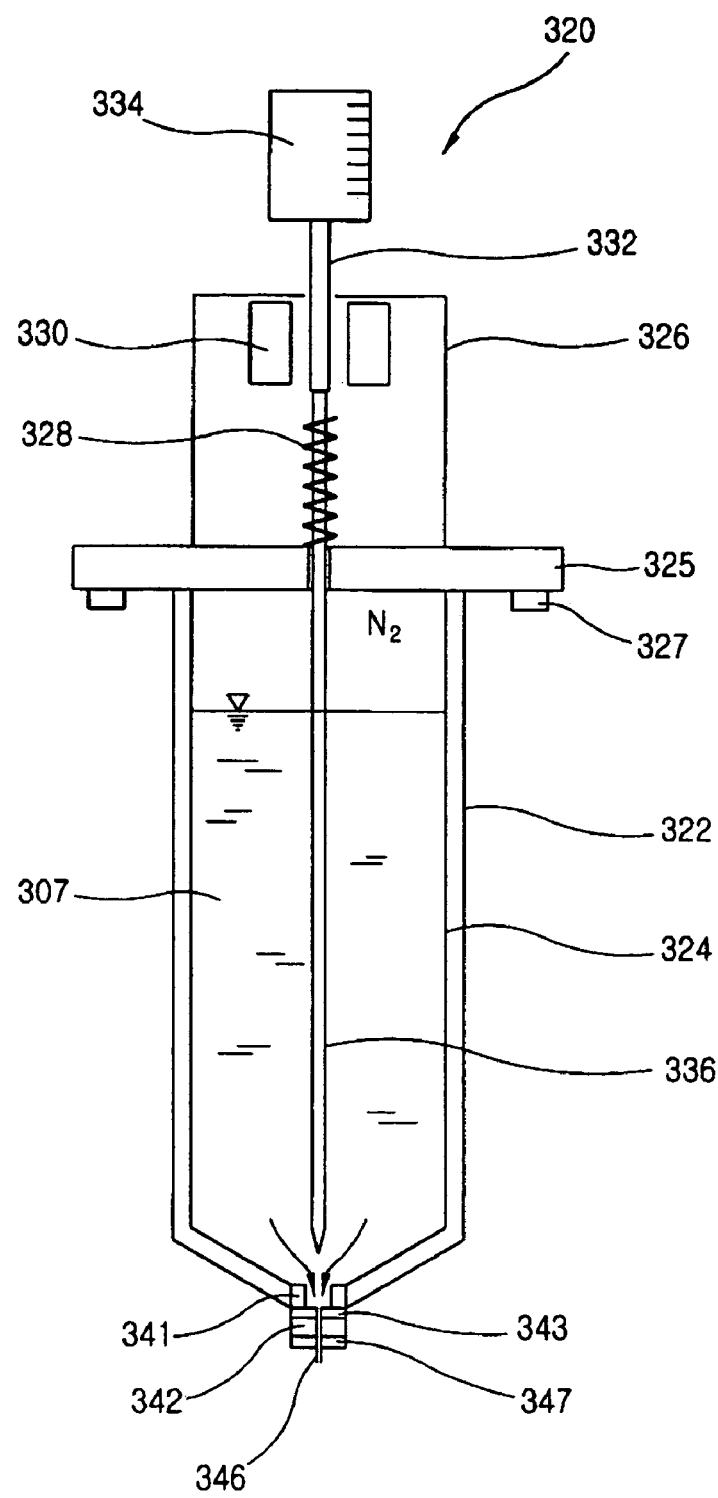
FIG. 11 illustrates a liquid crystal dispensing apparatus according to still another aspect of the present invention.

FIG. 11 illustrates a liquid crystal dispensing apparatus according to still another aspect of the present invention.

Referring to FIG. 11, an amount of liquid crystal material remaining within the liquid crystal container may be determined using a scale. For example, a scale 327 may be arranged beneath an upper cap 325 of a liquid crystal container 324. In one aspect of the present invention, the upper cap 325 fixes an upper case 326 to the liquid crystal container 324. In another aspect of the present invention, the upper cap 325 may fix the liquid crystal dispensing apparatus 320 to a driving device (not shown) capable of driving the liquid crystal dispensing apparatus 320. Accordingly, at least one scale 327 may be arranged beneath a lower surface of the upper cap 325 and determine a weight of the liquid crystal container 324. By determining the weight of the liquid crystal container 324, the scale 327 may be used to indirectly determine the weight of liquid crystal material 307 within the liquid crystal container 327. For example, the scale 327 may adjusted to read 'zero' when the liquid crystal container 324 does not contain any liquid crystal material 307. Next, liquid crystal material 307 is arranged within the liquid crystal container 324 and a tared weight measurement of the liquid crystal material 307 is taken. According to the principles of the present invention, the liquid crystal material 307 arranged within the liquid crystal container 324 has a predetermined density. Accordingly, after the tared weight of the liquid crystal material 307 is determined, a volume/mass of the amount of liquid crystal material remaining within the liquid crystal container 324 may be determined. The determined value may then be displayed.

According to the principles of the present invention, the liquid crystal material is dispensed onto the substrate while the liquid crystal dispensing apparatus 320 is fixed to and driven by the driving device. As mentioned above, liquid crystal material may be precisely dispensed by aligning a substrate with the liquid crystal dispensing apparatus. In one aspect of the present invention, after liquid crystal material has been dispensed onto a first panel area of a substrate, the liquid crystal dispensing apparatus 320 may be moved by the driving device to a second panel area of the substrate to thereby precisely dispense liquid crystal material at predetermined locations within the second panel area.

Figure 12A:
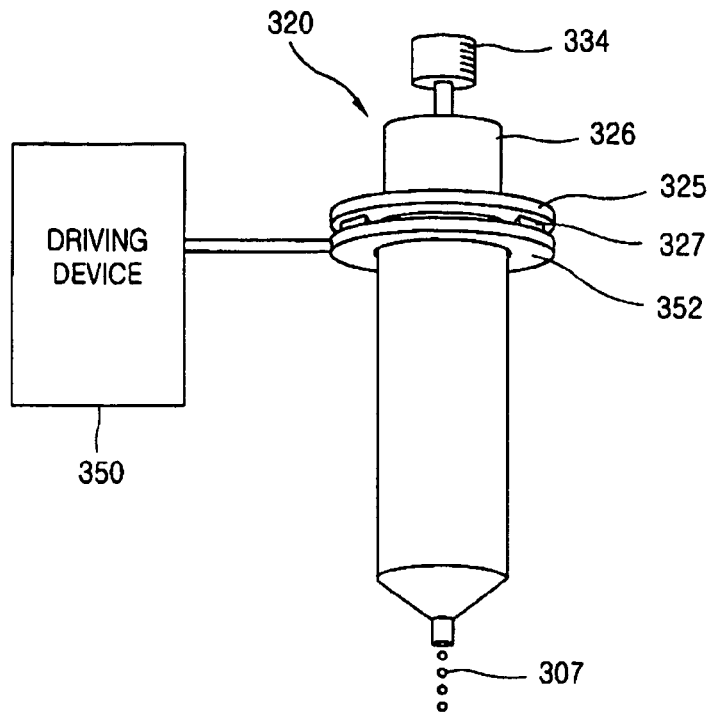
FIGS. 12A and 12B illustrate the measurement of remaining liquid crystal material by a scale.
Figure 12B:
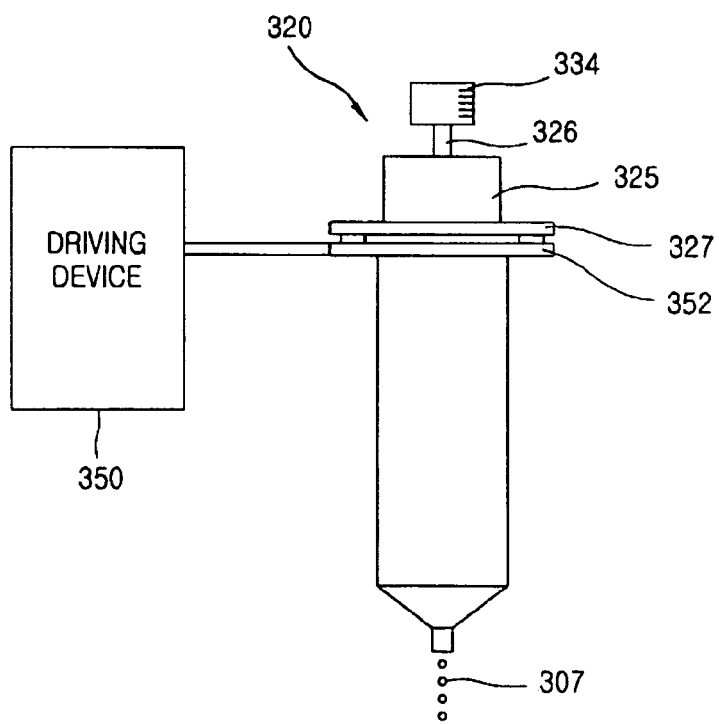

FIGS. 12A and 12B illustrate the measurement of remaining liquid crystal material by a scale.

Referring to FIG. 12A, the liquid crystal dispensing apparatus 320 may be fixed to a driving device 350. Referring to FIG. 12B, a weight of an amount of liquid crystal remaining within the liquid crystal container 324 may be measured by the scale 327 arranged beneath the upper cap 325 of the liquid crystal container 324.

As shown in FIGS. 12A and 12B, an upper portion of the liquid crystal dispensing apparatus 320 may be received by a supporting member 352 having a ring shape. In one aspect of the present invention, a diameter of the supporting member 352 may be greater than a diameter of the liquid crystal container 324 but substantially equal to a diameter of the upper cap 325. Therefore, upon arranging the liquid crystal dispensing apparatus 320 above the supporting member 352 and inserting the liquid crystal dispensing apparatus 320 into the supporting member 352, a lower surface of the upper cap 325 may contact an upper surface of the supporting member 352. Accordingly, the liquid crystal dispensing apparatus 320 may be fixed by the supporting member 352.

In one aspect of the present invention, at least one scale 327 maybe arranged at a lower surface of the upper cap 325. Accordingly, the scale 327 maybe arranged between the upper cap 325 and the supporting member 352. In another aspect of the present invention, the upper cap 325 may contact only the scale 327 and not the upper portion of the supporting member 352 such that substantially the entire weight of the liquid crystal dispensing apparatus 320 is applied to the scale 327. Accordingly, a weight of the liquid crystal dispensing apparatus 320 may be determined by the scale 327.

As mentioned above, the scale 327 is calibrated to read 'zero' when the liquid crystal dispensing apparatus 320 is substantially empty. Accordingly, any reading taken from the scale 327 when liquid crystal material 307 remains within the liquid crystal dispensing apparatus 320 indicates the weight of the liquid crystal material within the liquid crystal container 324. In yet another aspect of the present invention, a display device may be connected to the scale 327 to generate a signal indicating the tared weight of the liquid crystal material remaining within the liquid crystal dispensing apparatus. The tared weight may be converted into a volume, thereby indicating a remaining amount of liquid crystal material 307 remaining within the liquid crystal dispensing apparatus.

According to the principles of the present invention, an amount of liquid crystal material remaining within the liquid crystal container may be determined at any time. Accordingly, the excessive discarding of expensive liquid crystal material may be prevented and the cost of fabricating an LCD may be reduced.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. A method of manufacturing a liquid crystal display (LCD) device, comprising:
   providing a first substrate;
   providing a second substrate;
   dispensing a liquid crystal stored in a liquid crystal container on either the first or second substrate;
   forming a seal pattern with a sealant on either the first or second substrate;
   bonding the first and second substrates;
   curing the sealant;
   cutting the bonded first and second substrates; and wherein the liquid crystal is uniformly filled between the first and second substrates and the liquid crystal substantially does not come into contact with the sealant before curing, wherein said dispensing step comprises measuring and weighing the liquid crystal in the liquid crystal container using a scale arranged between an upper surface of a fixing member and a lower surface of an upper cap, wherein the scale determines a weight of the liquid crystal dispensing unit, and determining and displaying using a display unit whether a sufficient amount of the liquid crystal exists in the liquid crystal container to be dispensed to prevent a defect in the LCD device.

* * * * *